United States Patent Office 3,428,621
Patented Feb. 18, 1969

3,428,621
THIADIAZOLYL MONOAZO DYESTUFFS
David J. Wallace and Max A. Weaver, Kingsport, Tenn., assignors to Eastman Kodak Company, Rochester, N.Y., a corporation of New Jersey
No Drawing. Filed July 26, 1965, Ser. No. 474,964
U.S. Cl. 260—158                9 Claims
Int. Cl. C09b 49/12

ABSTRACT OF THE DISCLOSURE

Thiadiazolyl-azo-aniline compounds having a di(acyl)-amidoalkyl group attached to the aniline nitrogen atom are useful as dyes for hydrophobic fibers.

---

This invention relates to azo compounds particularly useful as dyes for textile fibers, yarns and fabrics. More particularly this invention relates to azo compounds of the general formula (I)
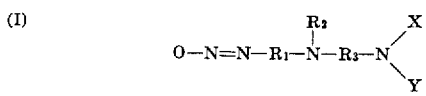

$R_1$ represents a monocyclic aromatic radical of the benzene series including unsubstituted phenylene, e.g., p-phenylene and substituted phenylene, e.g., such as lower alkylphenylene, e.g., o,m-methyl-p-phenylene; lower alkoxyphenylene, e.g., o,m-methoxy-p-phenylene, 2,5-dimethoxy - p - phenylene; lower alkanoylamidophenylene, e.g., o,m-acetamido-p-phenylene; halophenylene, e.g., o,m-chloro-p-phenylene; lower alkylsulfonamidophenylene, e.g., o,m - methylsulfonamido-p-phenylene; benzamidophenylene; and lower alkylthiophenylene, e.g., o,m-methylthio-p-phenylene.

$R_2$ represents hydrogen or an alkyl radical preferably lower alkyl, i.e., from 1 to 4 carbon atoms, being unsubstituted or substituted such as hydroxyalkyl, e.g., hydroxyethyl; lower alkoxyalkyl, e.g., methoxyethyl; cyanoalkyl, e.g., cyanoethyl; lower alkanoyloxyalkyl, e.g., acetoxyethyl; lower alkoxycarbonylalkyl, e.g., ethoxycarbonylethyl; halogenoalkyl, e.g., chloroethyl; lower alkylsulfonylalkyl, e.g., methylsulfonylethyl; carbamoylalkyl, e.g., carbamoylethyl, etc., or $R_2$ represents a monocyclic aromatic radical of the benzene series such as lower alkylphenyl, lower alkoxyphenyl, halophenyl and other substituted phenyl groups given above, or may be the same as —$R_3$—NXY, $R_3$ represents a lower alkylene group, i.e., a straight or branched chain of from 1 to 4 carbon atoms, and X and Y represent the same or different acyl groups, including carboxylic acid acyl such as, lower alkanoyl, e.g., propionyl; aroyl, e.g., benzoyl; lower alkoxycarbonyl, e.g., ethoxycarbonyl; carbamoyl, e.g. phenyl carbamoyl, etc., or sulfonyl groups such as lower alkylsulfonyl, e.g., methylsulfonyl; arylsulfonyl, e.g., phenylsulfonyl, and Q represents a 2-thiadiazolyl radical having the formula:

(II)
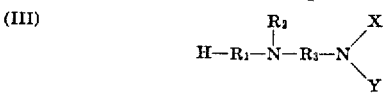

wherein

R represents H; or an organic radical such as lower alkyl, e.g., methyl, ethyl, propyl, isopropyl; aryl, e.g., phenyl, unsubstituted or substituted such as p-nitrophenyl, p-aminophenyl, lower alkylphenyl, e.g., o-tolyl, p-tolyl; lower alkylthio, e.g., methylthio, ethylthio, isopropylthio, etc.; arylthio, e.g., phenylthio, substituted phenylthio, etc.; lower alkylsulfonyl, methylsulfonyl, ethylsulfonyl, propylsulfonyl, isopropylsulfonyl, cyclohexylsulfonyl, etc.; arylsulfonyl, e.g., p-nitrophenylsulfonyl, benzenesulfonyl, m-nitrophenylsulfonyl α-naphthylsulfonyl, sulfonylamido, e.g., benzenesulfonamido, p-nitrobenzenesulfonamido, lower alkylphenylsulfonamido, o-ethylphenylsulfonamido, lower alkanoylamido, e.g., acetamido; benzamido, substituted benzamido, etc.

The azo compounds of this invention are prepared by diazotization of 2-aminothiadiazoles and coupling the diazotized products with the coupler of the general formula (III)
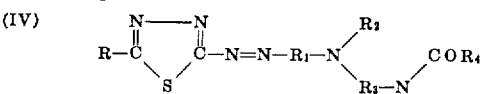

wherein $R_1$, $R_2$, $R_3$, X and Y have the meanings given above.

Particularly useful compounds of this invention are of the three general formulas:

(IV)
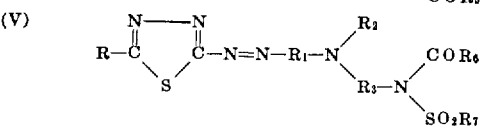

(V)

(VI)
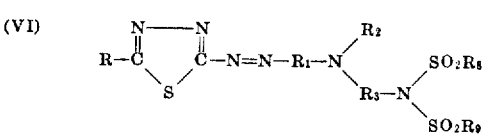

wherein R, $R_1$, $R_2$ and $R_3$ are defined above $R_4$ and $R_5$ = lower alkyl, lower alkoxy, phenyl, or phenyl substituted with lower alkyl, lower alkoxy, or halogen, $R_6$ and $R_7$ = lower alkyl, phenyl, or phenyl substituted with lower alkyl, lower alkoxy, or halogen, and $R_8$ and $R_9$ = lower alkoxy, phenyl, or phenyl substituted with lower alkyl, lower alkoxy, or halogen.

The groups X and Y differentiate these compounds from prior art compounds and favorably affect the dye characteristics such as light fastness and resistance to sublimation, especially when the compounds are used for dying textile materials. The substituents attached to thiadiazolyl radical, R, or to $R_1$, $R_2$, and $R_3$ are not critical and serve primarily as auxochromes to control the color of the azo compound.

The specific alkyl radicals and monocyclic aromatic radicals given above are also exemplary of the $R_4$–$R_9$ group.

The coupling components having the above Formula II are prepared in the following manner:

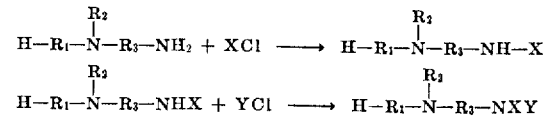

wherein $R_1$, $R_2$, $R_3$, X and Y are as defined above. These reactions result in compounds in which the newly substituted amines are diacyl substituted, disulphonyl substituted or acylsulphonyl substituted depending on the reactants chosen. A more detailed description of the coupler synthesis appears in preparative examples of co-pending application Ser. No. 458,417 and now Patent No. 3,379,713.

The resultant azo compounds can be used for dyeing textile materials including synthetic polymer fibers, yarns and fabrics giving a variety of fast shades including blue, yellow, red and brown when applied thereto by conventional dyeing methods. The compounds have moderate affinity for cellulose ester and polyamide fibers and possess the valuable property of staining wool less than do previous thiadiazole dyes. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative azo compounds of our invention. All of the couplers used were prepared in the manner described in copending application Ser. No. 458,417 and now Patent No. 3,379,313.

EXAMPLE 1

(A) Diazotization.—2.94 g. (0.02 m.) 2-amino-5-methylthio-1,3,4-thiadiazole was dissolved in 48 ml. of water containing 28 ml. conc. sulfuric acid at about 40° C. This solution was cooled to 5° C. and a solution of 1.44 g. $NaNO_2$ in 10 ml. conc. sulfuric acid was added at about 5° C. The reaction mixture was stirred at ice bath temperature for 2 hrs.

(B) Coupling.—5.96 g. (0.02 m.) of N-acetyl-N-[2-(N'-ethyl-m-toluidino)ethyl]methanesulfonamide was dissolved in 100 ml. of 1:5 acid (1 part propionic acid to 5 parts acetic acid). This solution was cooled in an ice bath and the diazotization reaction mixture from Example 1(A) was added with stirring. The coupling mixture was neutralized with solid ammonium acetate to brown on Congo red paper. After coupling in the cold for 2 hrs., the mixture was drowned in 1 liter of water, filtered, washed with water and dried. The product dyed polyester fibers a red shade of excellent fastness properties. The dye has the following structure:

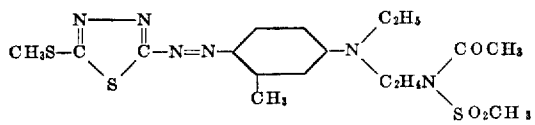

EXAMPLE 2

(A) Diazotization.—The diazotization reaction mixture was prepared as in Example 1(A).

(B) Coupling.—5.32 g. (0.02 m.) N-[2-(N'-ethyl-m-toluidino)ethyl]diacetamide was dissolved in 100 ml. of 1:5 acid (1 part propionic acid to 5 parts acetic acid). This solution was cooled in an ice bath and the diazotization reaction mixture from Example 2(A) was added with stirring. The coupling mixture was neutralized with solid ammonium acetate to brown on Congo red paper. After coupling in the cold for 2 hrs., the mixture was drowned in 1 liter of water, filtered, washed with water and dried. The product dyed polyester fibers red shades of excellent fastness. The dye has the following structure:

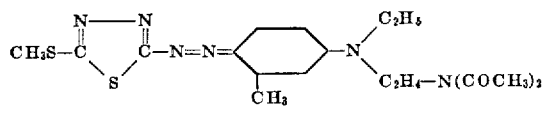

EXAMPLE 3

(A) Diazotization.—The diazotization reaction mixture was prepared as in Example 1(A).

(B) Coupling.—The procedure of Example 1(B) was utilized except that the coupler used was 6.68 g. (0.02 mole) N - [2 - (N'-ethyl-m-toluidino)ethyl]dimethanesulfonamide. This dye gives red shades of good fastness on polyester fibers. The dye has the following structure:

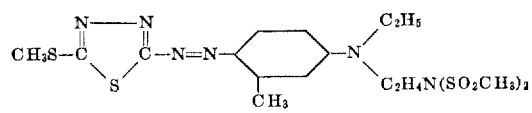

EXAMPLE 4

(A) Diazotization.—3.72 g. (0.02 m.) 2-amino-5-2'-cyanoethylthio-1,3,4-thiadiazole was dissolved in 48 ml. of water containing 28 ml. conc. sulfuric acid at about 40° C. This solution was cooled to 5° C. and a solution of 1.44 g. $NaNO_2$ in 10 ml. conc. sulfuric acid was added at about 5° C. The reaction mixture was stirred at ice bath temperature for 2 hrs.

(B) Coupling.—The procedure of Example 1(B) was used using the diazo reaction mixture from Example 4(A). The dye gives red shades of good fastness on polyester fibers. The dye has the following structure:

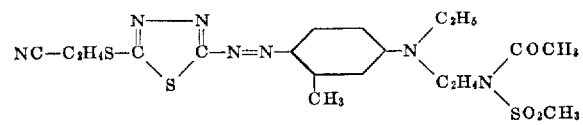

EXAMPLE 5

(A) Diazotization.—3.66 g. (0.02 m.) 2-amino-5-phenyl-1,3,4-thiadiazole was dissolved in 48 ml. of water containing 28 ml. conc. sulfuric acid at about 40° C. This solution was cooled to 5° C. and a solution of 1.44 g. $NaNO_2$ in 10 ml. conc. sulfuric acid was added at about 5° C. The reaction mixture was stirred at ice bath temperature for 2 hrs.

(B) Coupling.—The procedure of Example 2(B) was used using the diazotization reaction mixture from Example 5(A). The dye gives red shades of good fastness on polyester fibers. The dye has the following structure:

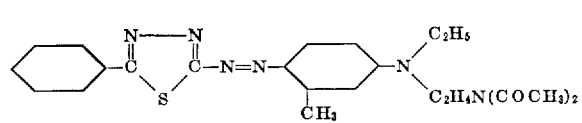

The azo compounds of the following table are prepared utilizing the preparative methods described above. The color indicated is that obtainable upon dyeing polyester fibers.

| Example No. | R | Substituents On Ring of $R_1$ | $R_2$ | $R_3$ | X | Y | Color |
|---|---|---|---|---|---|---|---|
| 6 | $CH_3S$— | None | $C_2H_5$ | $-CH_2CH_2$— | $-COCH_3$ | $-SO_2CH_3$ | Orange. |
| 7 | $CH_3S$— | 3-$CH_3$ | $-C_2H_4CN$ | $-CH_2CH_2$— | $-COCH_3$ | $-SO_2CH_3$ | Do. |
| 8 | $CH_3S$— | 3-$CH_3$ | $-C_2H_4Cl$ | $-CH_2CH_2$— | $-SO_2CH_3$ | $-SO_2CH_3$ | Red. |
| 9 | $CH_3S$— | 3-$CH_3$ | $-C_2H_4OH$ | $-CH_2CH_2$— | $-SO_2CH_3$ | $-SO_2CH_3$ | Red. |
| 10 | $CH_3S$— | 3-$CH_3$ | $-C_2H_4NXY$ | $-CH_2CH_2$— | $-SO_2CH_3$ | $-SO_2CH_3$ | Red. |
| 11 | $CH_3S$— | 3-$CH_3$ | $-C_2H_4CONH_2$ | $-CH_2CH_2$— | $-COCH_3$ | $-COCH_3$ | Red. |
| 12 | $CH_3S$— | 3-$CH_3$ | $-C_2H_4OCOCH_3$ | $-CH_2CH_2$— | $-COCH_3$ | $COC_2H_5$ | Red. |
| 13 | $CH_3S$— | 3-$CH_3$ | $C_2H_4SO_2CH_3$— | $-CH_2CH_2CH_2$— | $-COC_6H_5$ | $-SO_2CH_3$ | Red. |
| 14 | $CH_3S$— | 3-$CH_3$ | $-C_2H_5$ | $-CH_2CH_2$— | $-COC_6H_5$ | $-COC_6H_5$ | Red. |
| 15 | $C_2H_5S$— | 2-$CH_3$ | —H | $-CH_2CH_2$— | $-COCH_3$ | $-COCH_3$ | Orange. |
| 16 | $C_6H_5S$— | 3-$OCH_3$ | $-C_2H_5$ | $-CH_2(CH_3)CH-CH_2$— | $-SO_2CH_3$ | $-CO_2C_2H_5$ | Pink. |
| 17 | $C_6H_5S$— | 3-Cl | $-C_2H_5$ | $-CH_2CH_2$— | $-SO_2CH_3$ | $-CONHC_6H_5$ | Red. |
| 18 | Cyclohexylthio | 3-$NHCOCH_3$ | $-C_2H_5$ | $-CH_2CH_2$— | $-SO_2CH_3$ | $-CONH_2$ | Pink. |
| 19 | do | 3-$OCH_3$-6-$CH_3$ | $-C_2H_5$ | $-CH_2CH_2$— | $-SO_2CH_3$ | $-SO_2C_6H_5$ | Do. |
| 20 | $CH_3$— | 2,5-di-$OCH_3$ | $C_2H_4OCONHC_6H_5$ | $-CH_2CH_2$— | $-SO_2CH_3$ | $-SO_2C_4H_9$ | Do. |
| 21 | $CH_3$— | 3-$CH_3$ | $-C_2H_5$ | $-CH_2CH_2$— | $-SO_2CH_3$ | $-COCH_3$ | Red. |
| 22 | $C_6H_5$— | 3-$CH_3$ | $-C_2H_5$ | $-CH_2CH_2$— | $-SO_2CH_3$ | $-COCH_3$ | Red. |
| 23 | $C_6H_5$— | 3-$CH_3$ | $-C_2H_5$ | $-CH_2CH_2$— | $-SO_2CH_3$ | $-SO_2CH_3$ | Red. |

| Example No. | R | Substituents On Ring of R₁ | R₂ | R₃ | X | Y | Color |
|---|---|---|---|---|---|---|---|
| 24 | CH₃SO₂— | 3-CH₃ | —C₂H₅ | —CH₂CH₂— | —SO₂CH₃ | —COCH₃ | Violet. |
| 25 | CH₃SO₂— | 3-CH₃ | —C₂H₅ | —CH₂CH₂— | —SO₂CH₃ | —SO₂CH₃ | Do. |
| 26 | NCCH₂CH₂S— | 3-CH₃ | —C₂H₅ | —CH₂CH₂— | —SO₂CH₃ | —SO₂CH₃ | Red. |
| 27 | NCCH₂CH₂S— | 3-CH₃ | —C₂H₅ | —CH₂CH₂— | —SO₂CH₃ | —COCH₃ | Red. |
| 28 | CH₃CONH— | 3-CH₃ | —C₂H₅ | —CH₂CH₂— | —SO₂CH₃ | —COCH₃ | Red. |
| 29 | CH₃CONH— | 3-CH₃ | —C₂H₅ | —CH₂CH₂— | —SO₂CH₃ | —SO₂CH₃ | Red. |
| 30 | C₆H₅S0₂— | 3-CH₃ | —C₂H₅ | —CH₂CH₂— | —SO₂CH₃ | —SO₂CH₃ | Red. |
| 31 | C₆H₅SO₂— | 3-CH₃ | —C₂H₅ | —CH₂CH₂— | —SO₂CH₃ | —COCH₃ | Red. |
| 32 | Br— | 3-CH₃ | —C₂H₅ | —CH₂CH₂— | —SO₂CH₃ | —COCH₃ | Red. |
| 33 | Cl— | 3-CH₃ | —C₂H₅ | —CH₂CH₂— | —SO₂CH₃ | —COCH₃ | Red. |
| 34 | —CH₂CO₂C₂H₅ | 3-CH₃ | —C₂H₅ | —CH₂CH₂— | —SO₂CH₃ | —COCH₃ | Red. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds, into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

We claim:

1. An azo compound having the formula

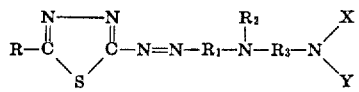

wherein

R is hydrogen, lower alkyl, lower alkylthio, cyanoethylthio, phenylthio, cyclohexylthio, lower alkylsulfonyl, phenylsulfonyl, cyclohexylsulfonyl, phenyl, lower alkylphenyl, phenylsulfonamido, lower alkylsulfonamide, lower alkanoylamido, or benzamido;

R₁ is p-phenylene or p-phenylene substituted with lower alkyl, lower alkoxy, halogen, lower alkylthio, lower alkanoylamido, lower alkylsulfonamido, or benzamido;

R₂ is hydrogen; lower alkyl; lower alkyl substituted with hydroxy, lower alkoxy, cyano, lower alkanoyloxy, lower alkoxycarbonyl, halogen, lower alkylsulfonyl, or carbamoyl; phenyl; or phenyl substituted with lower alkyl, lower alkoxy, or halogen;

R₃ is lower alkylene; and

X and Y are the same or different and each is lower alkanoyl, benzoyl, lower alkylbenzoyl, lower alkoxybenzoyl, halobenzoyl, lower alkoxycarbonyl, lower alkylsulfonyl, phenylsulfonyl, lower alkylphenylsulfonyl, lower alkoxyphenylsulfonyl, or halophenylsulfonyl.

2. An azo compound according to claim 1 wherein

R₂ is lower alkyl;

R₃ is ethylene; and

X and Y are lower alkanoyl, lower alkoxycarbonyl, benzoyl, lower alkylbenzoyl, lower alkoxybenzoyl, or halobenzoyl.

3. An azo compound according to claim 1 wherein

R₂ is lower alkyl;

R₃ is ethylene;

X is lower alkanoyl, lower alkoxy, benzoyl, lower alkylbenzoyl, lower alkoxybenzoyl, or halobenzoyl; and Y is lower alkylsulfonyl, phenylsulfonyl, lower alkylphenylsulfonyl, lower alkoxyphenylsulfonyl, or halophenylsulfonyl.

4. An azo compound according to claim 1 wherein

R₂ is lower alkyl;

R₃ is ethylene; and

X and Y are lower alkylsulfonyl, phenylsulfonyl, lower alkylphenylsulfonyl, lower alkoxyphenylsulfonyl, or halophenylsulfonyl.

5. An azo compound of the formula:

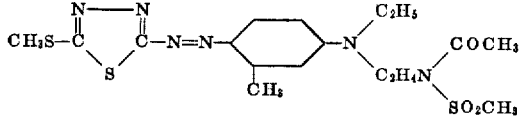

6. An azo compound of the general formula:
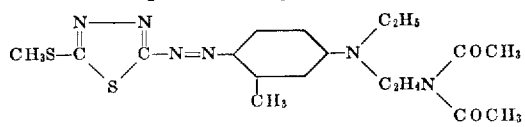
7. An azo compound of the general formula:
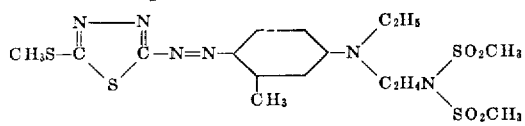
8. An azo compound of the general formula:
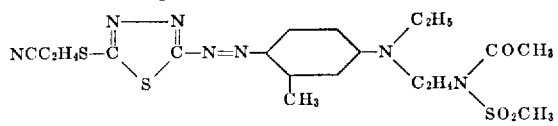
9. An azo compound of the general formula:
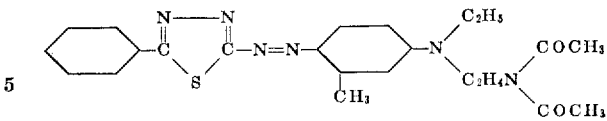
References Cited
UNITED STATES PATENTS
2,346,013  4/1944  Dickey _____ 260—158
FOREIGN PATENTS
1,304,317  8/1962  France.
CHARLES B. PARKER, *Primary Examiner.*
D. M. PAPUGA, *Assistant Examiner.*
U.S. Cl. X.R.
260—302, 306.8, 556, 558, 562, 490, 472, 465, 37; 8—41, 55, 54.2